United States Patent
Maestas

(10) Patent No.: US 11,346,377 B2
(45) Date of Patent: May 31, 2022

(54) SYSTEM AND METHOD FOR AUTOMATIC CALIBRATION OF ACTUATORS

(71) Applicant: Epiroc Drilling Solutions, LLC, Garland, TX (US)

(72) Inventor: Gavin Maestas, Richardson, TX (US)

(73) Assignee: Epiroc Drilling Solutions, LLC, Garland, TX (US)

( * ) Notice: Subject to any disclaimer, the term of this patent is extended or adjusted under 35 U.S.C. 154(b) by 0 days.

(21) Appl. No.: 17/000,421

(22) Filed: Aug. 24, 2020

(65) Prior Publication Data

US 2022/0056932 A1    Feb. 24, 2022

(51) Int. Cl.
F15B 21/08    (2006.01)
F15B 19/00    (2006.01)

(52) U.S. Cl.
CPC .......... *F15B 19/002* (2013.01); *F15B 21/087* (2013.01); *F15B 2211/615* (2013.01); *F15B 2211/6336* (2013.01); *F15B 2211/6656* (2013.01); *F15B 2211/857* (2013.01)

(58) Field of Classification Search
CPC  F15B 2211/857; F15B 2211/80; E21B 44/00; E21B 7/02; G05B 11/42
See application file for complete search history.

(56) References Cited

U.S. PATENT DOCUMENTS

| | | | |
|---|---|---|---|
| 4,474,155 A | 10/1984 | Sagues | |
| 4,754,391 A | 6/1988 | Suzuki | |
| 5,568,377 A | 10/1996 | Seem et al. | |
| 5,912,541 A | 6/1999 | Bigler et al. | |
| 6,385,520 B1 | 5/2002 | Jain et al. | |
| 6,425,450 B1* | 7/2002 | Lansberry | B62D 49/0635 180/6.24 |
| 6,581,710 B2 | 6/2003 | Sprinkle et al. | |
| 6,807,472 B2 | 10/2004 | Ford et al. | |
| 7,024,253 B2* | 4/2006 | Gaikwad | G05B 11/42 700/28 |

(Continued)

OTHER PUBLICATIONS

Truong, Dinh Quang, Truong Quoc Thanh, and Kyoung Kwan Ahn. "Development of a novel linear magnetic actuator with trajectory control based on an online tuning fuzzy PID controller." International Journal of Precision Engineering and Manufacturing 13.8 (2012): 1403-1411.

(Continued)

*Primary Examiner* — Thomas E Lazo
(74) *Attorney, Agent, or Firm* — Shannon Bates; Harper & Bates LLP

(57) ABSTRACT

A system for automatic calibration of an actuator, where the system has an actuator and a computer, and the computer further includes a PID controller. A sensor connected to the actuator transmits values representing the motion of the actuator to the input of the PID controller. The computer is programmed to compare the values representing the motion of the actuator to the output of the PID controller, thus outputting an error signal representing the difference between the output of the PID controller and the values representing the motion of the actuator. The computer stores this difference as a calibrated set point for the actuator when the difference is less than a predetermined amount. This calibrated set point is used to initialize the operation of a machine propelled by the actuator.

17 Claims, 7 Drawing Sheets

(56) References Cited

U.S. PATENT DOCUMENTS

| | | | |
|---|---|---|---|
| 7,245,103 B2 | 7/2007 | Chapman et al. | |
| 7,415,389 B2 | 8/2008 | Stewart et al. | |
| 7,594,448 B2* | 9/2009 | Jacobson | F17D 5/00 73/865.8 |
| 7,783,404 B2* | 8/2010 | Fackler | A01D 69/00 701/50 |
| 7,881,844 B2* | 2/2011 | Strosser | A01D 41/14 701/50 |
| 8,184,418 B2 | 5/2012 | Lehner | |
| 8,301,275 B2 | 10/2012 | Tondolo et al. | |
| 8,414,270 B2 | 4/2013 | Sah et al. | |
| 8,612,084 B2* | 12/2013 | Hennessy | G05D 1/0278 701/25 |
| 9,183,827 B2 | 11/2015 | Stothers et al. | |
| 9,347,504 B2 | 5/2016 | Paielli et al. | |
| 9,519,275 B2 | 12/2016 | Yamamoto | |
| 9,739,262 B2 | 8/2017 | Wang et al. | |
| 10,023,303 B2 | 7/2018 | Moutaux et al. | |
| 10,132,608 B2 | 11/2018 | Piaulet et al. | |
| 10,168,672 B2* | 1/2019 | Bellido-Gonzalez | G05B 11/42 |
| 10,183,852 B2 | 1/2019 | Das et al. | |
| 10,197,763 B2 | 2/2019 | Cheong et al. | |
| 10,288,170 B2* | 5/2019 | Karlsson | B60W 30/18054 |
| 2010/0231158 A1* | 9/2010 | Jonsson | H02P 5/46 318/609 |
| 2017/0151875 A1* | 6/2017 | Campbell | B60L 15/025 |
| 2019/0131894 A1 | 5/2019 | Rivera et al. | |
| 2019/0301496 A1* | 10/2019 | Mujumdar | G05D 7/0688 |

OTHER PUBLICATIONS

Shi, Zhenyun, et al. "A fuzzy PID-controlled SMA actuator for a two-DOF joint." Chinese Journal of Aeronautics 27.2 (2014): 453-460.

Zhang, Q., et al. "Use of adaptive control algorithms for automatic calibration of electrohydraulic actuator control." Applied Engineering in Agriculture 17.3 (2001): 259.

Wang, Bin, et al. "PID Control of an Electric Clutch Actuator." Applied Mechanics and Materials. vol. 190. Trans Tech Publications, 2012.

\* cited by examiner

Propel Calibration

Start Speed Calibration ☐

Speed Change To Detect High Current  [0.6562] ft/s
Speed To Detect Min Current  [0.000328] ft/s

| CS Track, Cab First | | | NCS Track, Cab First | | |
|---|---|---|---|---|---|
| Lowest valve current | 0 | [360] mA | Lowest valve current | 0 | [195] mA |
| Highest valve current | 0 | [580] mA | Highest valve current | 0 | [385] mA |
| CS Track, Cab Last | | | NCS Track, Cab Last | | |
| Lowest valve current | 0 | [360] mA | Lowest valve current | 0 | [195] mA |
| Highest valve current | 0 | [580] mA | Highest valve current | 0 | [385] mA |

Use calibration parameters ☐

| | FSM-state | Encoder | Out | |
|---|---|---|---|---|
| Monitor CS | deactivated ▼ | 0.00 | 0 | |
| Monitor NCS | deactivated ▼ | 0.00 | 0 | Esc |

Fig. 3

SYSTEM AND METHOD FOR AUTOMATIC CALIBRATION OF ACTUATORS

BACKGROUND

Technical Field

This disclosure relates to improvements in and relating to the calibration and parameterization of the feedback control systems used for mechanical actuators.

Background

Feedback control is commonly used to regulate and control mechanical systems as well as processes. Control systems typically comprise sensors and actuators whereby actuator inputs lead to actuator movement or other process changes that are detected by the sensors. In almost all cases, there is a non-linear relationship between actuator input and sensor outputs, which can be attributed to a wide range of system variables, such as the speed of the actuators, the responsiveness or resolution of the sensors, time lags, mechanics, inertia, and wear on the actuators or other mechanical parts, all as will be well-understood by persons skilled in the art.

As such, almost all control systems require certain parameters contained in the control algorithm to be adjusted in order to meet performance specifications. Control algorithm parameters are generally manually adjusted because real-world situations or real experimental environments, in many cases, cannot be fully modelled and simulated.

Actuators in industrial automation applications require an input in the form of current, voltage, or the like over a range of values that is roughly given by the manufacturer of the actuator. This so-called input range can vary between specific actuators and can change as actuator performance degrades over time. For automation applications to work correctly the input must elicit an expected output, so knowing this actual input range is important. The process of setting these parameters is known as "calibration" and is often a time-consuming process whereby an engineer or technician must manually identify the working input range of the actuator and determine the minimum and maximum input values for a given actuator response. Furthermore, when actuator performance degrades with use, re-calibration is necessary to return the system to proper performance. Then once again, an engineer or technician must manually calibrate this range, negating the premise of a fully autonomous system. The input ranges identified by the technician are then used as parameter settings for the control system. Without these maximum and minimum values, actuators would have a dead band zone causing unnecessary lag from input to response. Furthermore, actuator parameters can be different even for machines of the same type.

The calibration of control systems need not be only directed to calibration of the sensor response responsible for feedback control. What is needed is a fast and accurate method of calibrating the input to the actuator itself, so that that a given control set point will reliably result in a predictable actuator response, notwithstanding changes in system parameters as mentioned above.

This disclosure is relevant to feedback control systems generally. However, the disclosure is particularly useful in the field of motor control, where the motors are actuators for some machine system, such as a vehicle drive. In most of the following disclosure, the principles of operation claimed are illustrated by the calibration of motor actuators in tracked vehicles, such as mobile drilling machines, but the scope of the claims is not so limited.

DRAWINGS

Non-limiting embodiments of the claimed improvements are described by way of example in the following drawings, which are schematic and are not intended to be drawn to scale:

FIG. 3 illustrates an exemplary visual display for an actuator system in an embodiment illustrating the parameters to be calibrated.

SUMMARY

I disclose a system for automatic calibration of an actuator, where the system has an actuator and a computer, and the computer further includes a PID controller. A sensor connected to the actuator transmits values representing the motion of the actuator to the input of the PID controller. The computer is programmed to compare the values representing the motion of the actuator to the output of the PID controller, thus outputting an error signal representing the difference between the output of the PID controller and the values representing the motion of the actuator. The computer stores this difference as a calibrated set point for the actuator when the difference is less than a predetermined amount. This calibrated set point is used to initialize the operation of a machine propelled by the actuator.

DETAILED DESCRIPTION

Figure 1:
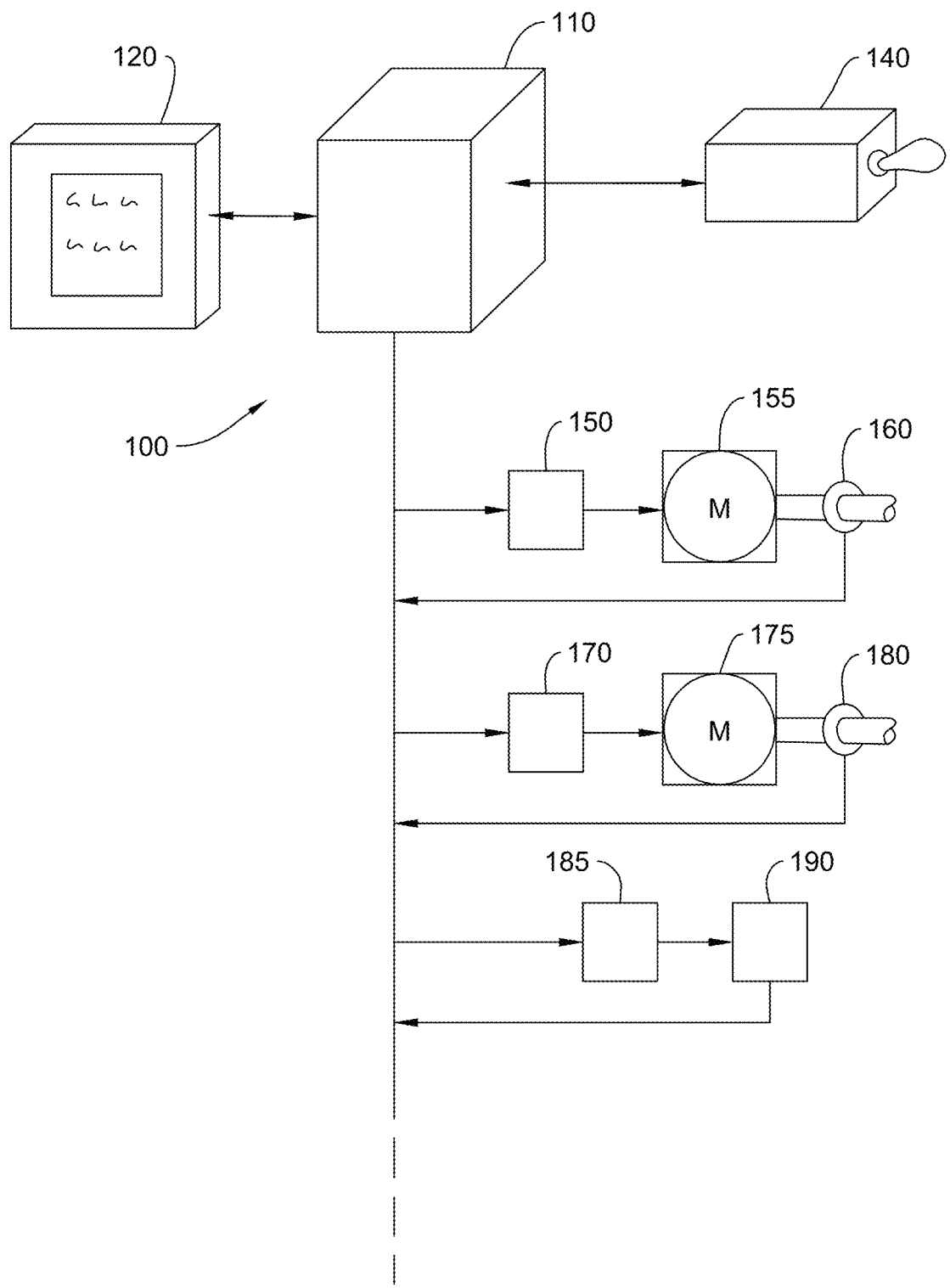
FIG. 1 is a schematic diagram illustrating connections between the control functions and actuator functions of an embodiment, using an example hydraulic motor as the actuator.

The automatic calibration system and method may be best illustrated by an example from a practical application; that is, the calibration of actuator motors driving a tracked vehicle, such as a mobile drilling machine. Such a drilling machine typically has a chassis supporting a drill tower, which tower supports a drill pipe driven by an electric or hydraulic motor for turning a bit. In this practical application, there will be a motor driving the right track and a motor driving the left track, both tracks moveably connected to the chassis, and it is important that the motors operate at the same maximum speed if the vehicle is to tram in a straight line. Thus the control input for the maximum speed of both motors must be calibrated, and the speed of the slowest motor chosen as the maximum for operation of the vehicle. FIG. 1 shows schematically the connections between functional parts for controlling the operation of the example drilling machine.

In FIG. 1 the control system 100 operatively associated with the example vehicle comprises a computer 110 that is typically a programmable digital computer further comprising a read-only memory, a non-transitory computer readable storage medium for storing instructions executable by a processor (such as a random-access memory), a central-processing unit or processor, and a hard drive or flash memory or the like for further storage of programs and data, as well as input and output ports. FIG. 1 shows the example control system 100 operatively connecting the computer 110 to a visual display 120 for an operator, and a motor control input interface 140, such as a joystick. In this disclosure, the term "computer" may be used broadly to refer to both a computer, the software executed by the computer, and relevant peripheral devices connected to a computer, as well as networks of computers. One industrial example of a computer 110 suitable for controlling the operations of actuators in a tracked vehicle is the Rig Control System (RCS) provided by Epiroc Drilling Solutions, LLC.

The computer system 110 illustrated here communicates with a right-track actuator subsystem comprising a transducer, such as an electrical-to-hydraulic transducer 150, a right motor actuator 155, and a right motor speed sensor 160. FIG. 1 further shows a left-track actuator subsystem comprising a transducer, such as an electrical-to-hydraulic transducer 170, a left motor actuator 175, and a left motor speed sensor 180, as well as possibly other subsystems further comprising transducers 185 and actuators 190, etc., as necessary for operation of the vehicle in other functions, for example, as a drilling machine. The features of the right-track actuator subsystem 150-160, and the left-track actuator subsystem 170-175 are explained in more detail below. An example of a suitable electric-to-hydraulic transducer for this application is the 9A Striker pump controller for the Parker Goldcup series of hydraulic pumps, although other and similar pump controllers could be used. Where, as in this example, the transducer has a hydraulic output, the convention is to refer to it as a "valve", and the term "valve" is used interchangeably with "transducer" in this application, unless otherwise stated.

Figure 2:
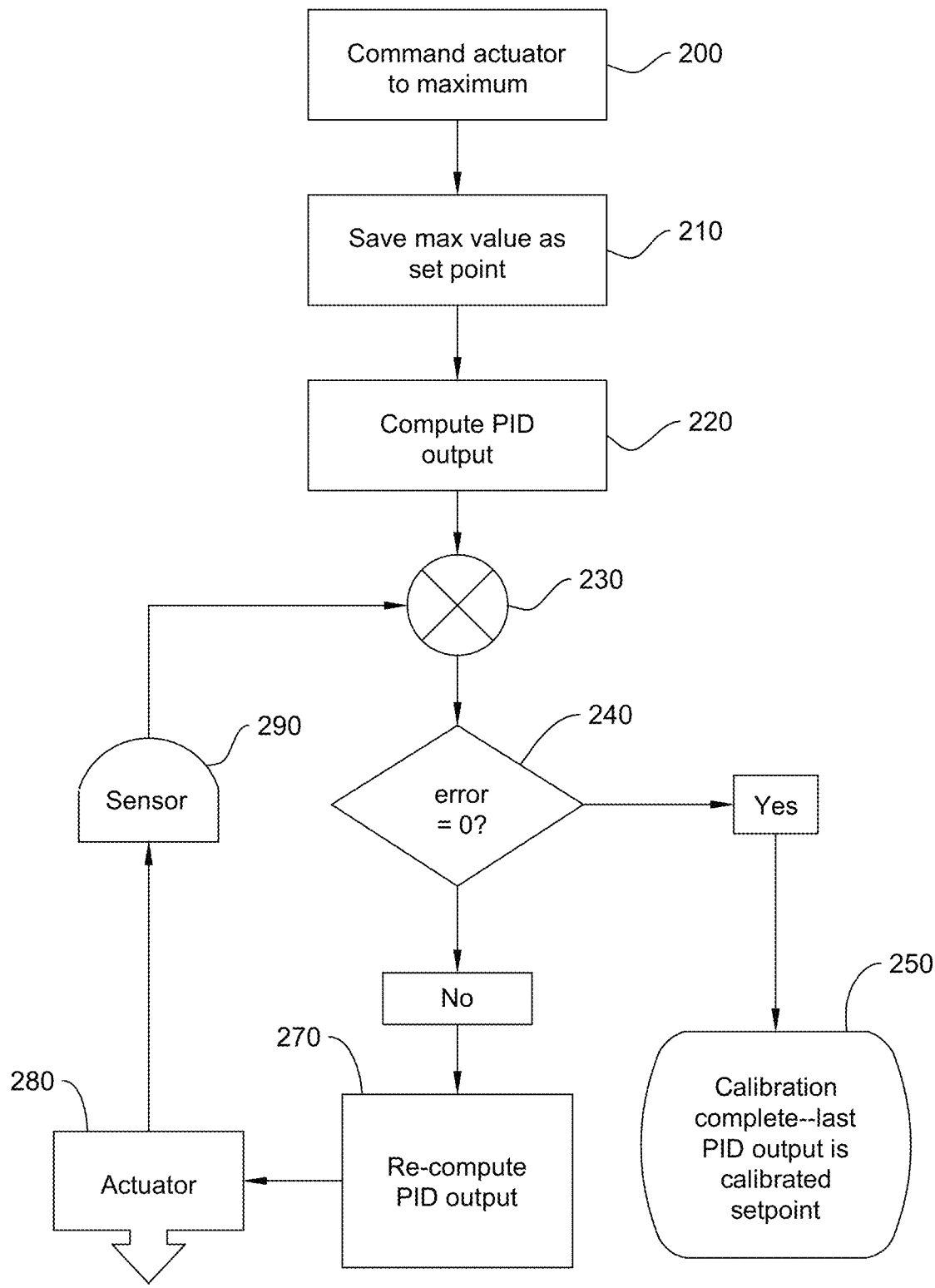
FIG. 2 is a flow chart illustrating the overall function of an embodiment of the control system.

FIG. 2 is a flowchart showing the basic operation of the automatic calibration subsystem in an embodiment comprising one actuator, where the actuator is assumed to have some output such as speed or force which can be measured by a sensor. For simplicity in the flowchart of FIG. 2, only a reference to one actuator 155 and one sensor 160 will be made, although the reader will understand that the process illustrated may be expanded to include multiple actuators and sensors, as shown schematically in the preceding drawing. Reference numerals in FIG. 2 refer to process steps and not to physical components At step 200 in the flowchart of FIG. 2, the actuator 155 is manually commanded to some maximum output, as measured by, for example, a motor speed, by sending the actuator an input control signal appropriate to the particular actuator. At step 210, this maximum output value is saved as a set point for proportional-integral-derivative (PID) controller. The maximum output value could be stored as a drive signal in mA, for example, or, conveniently for control of a tracked vehicle, as a computed track speed, in, for example, meters/second.

In the embodiments illustrated in this application, the minimum and maximum output values are assumed to be track speeds, e.g. meters/second or feet/second. But the reader should recognize that the "output values" in other systems covered by the claims could be measured in RPM, or hydraulic pressure, or a current drive as illustrated, for example, in FIG. 3.

At step 220 a PID output is computed based on predetermined parameters set for the PID. The output value is saved as a set point in the storage of computer 110 or in some dedicated controller.

At step 230, the set point from step 220 is compared with the sensor output of the actuator produced at step 290, which sensor output is generated corresponding to the actuator output at step 280. (A suitable sensor for motor speed would be a Hall-effect sensor manufactured by the Bosch Rexroth Company.) The sensor output at step 290 is produced in the same units as the PID output produced at step 220, such as track speed, or converted to the same.

If the error detected at step 240 between the two signals is zero (within some acceptable predetermined range, although shown as "0" in FIG. 2), then at step 250, calibration is complete, and the last PID output is saved as the future set point for maximum output from the actuator under test. That is, the saved PID output is the calibrated set point for the maximum output from the actuator. As shown in FIG. 3, and discussed below, the calibrated PID output may be expressed as a current drive to a transducer 150, or as a percentage of a maximum current drive, units that would be convenient to an operator of typical tracked drilling machines.

If the error signal at step 240 is not zero then the present set point value is transmitted at step 270 to the PID controller. The output of the PID controller is re-computed and stored as the present set point and transmitted to the actuator subsystem at step 280. The resulting output of the actuator from step 280 as measured by the sensor at step 290, is returned to the comparison at step 230, and processing continues until the loop converges on a calibrated set point.

In the same manner as just described, the control system finds a minimum set point for the actuator, and this minimum set point will also be saved as a calibrated set point for the minimum output from the actuator.

FIG. 3 illustrates an exemplary visual display 120 for an actuator system in an embodiment, illustrating the parameters to be calibrated and providing an interface for such calibration. Here the visual display 120 is assumed a part of the control system 100 for a tracked vehicle. The visual display 120 is connected to communicate with the computer 110 as described above. The display 120 will initially show the default parameters for the actuator system. In some embodiments the visual display 120 may have control inputs, such as with a touch screen.

In FIG. 3, the following nomenclature is used, consistent with practice for tracked drilling machines in the mining industry: "CS" represents the cab side of the vehicle (and thus the track on that side), and "NCS" represents the non-cab side of the vehicle (and thus the track on that side); the operator's cab of the vehicle typically being offset from the centerline of the vehicle. The terms "First" and "Last" represent the first and last actuators 155, 175 on each side of the vehicle. The term "valve current" refers to the current sent by the control system 100 to the electric-to-hydraulic transducer 150, 170. This transducer, or "valve" in FIG. 3 may, for example, be the electric-to-hydraulic transducer referred to above. The valve current in this example represents the calibrated set point that is the PID set point, expressed as a current drive to a transducer 150 or as a percentage of a maximum current drive. When selected, the new, calibrated, parameters replace the default parameters on the display 120. This calibrated set point is used to initialize the operation of the machine propelled by the actuator 155, 175.

Again, the reader should note that this disclosure is not limited to systems with hydraulic actuators, or to transducers of this type, but covers generally any type of actuator controlled and calibrated as described herein. In fact, in some embodiments, control of the actuator 155, 175 may take place directly, without any transducer 150, 170, where the actuator inputs allow for this.

A graphical program or graphical model is a diagram comprising a plurality of interconnected nodes or icons, wherein the plurality of interconnected nodes or icons visually indicate functionality of the program. The interconnected nodes or icons are graphical source code for the program. Graphical function nodes may also be referred to as blocks. Exemplary graphical program development environments which may be used to create graphical programs include Simulink from MathWorks or LabVIEW from National Instruments. Some of the figures in this application are illustrations adapted from Simulink graphical models, but such figures are merely illustrative examples and do not limit the claims to any particular graphical program or depiction. The claimed methods could be implemented, for example, in C or C++ code directly. The purpose of any model is to generate code for execution on the computer 110 controlling the system 100.

The meaning of the Simulink symbols shown in the drawings should be known to those skilled in the art, but if needed, descriptions of such symbols may be found at the Simulink web site, https://www.mathworks.com, and the links there to the relevant symbol libraries.

Figure 4:
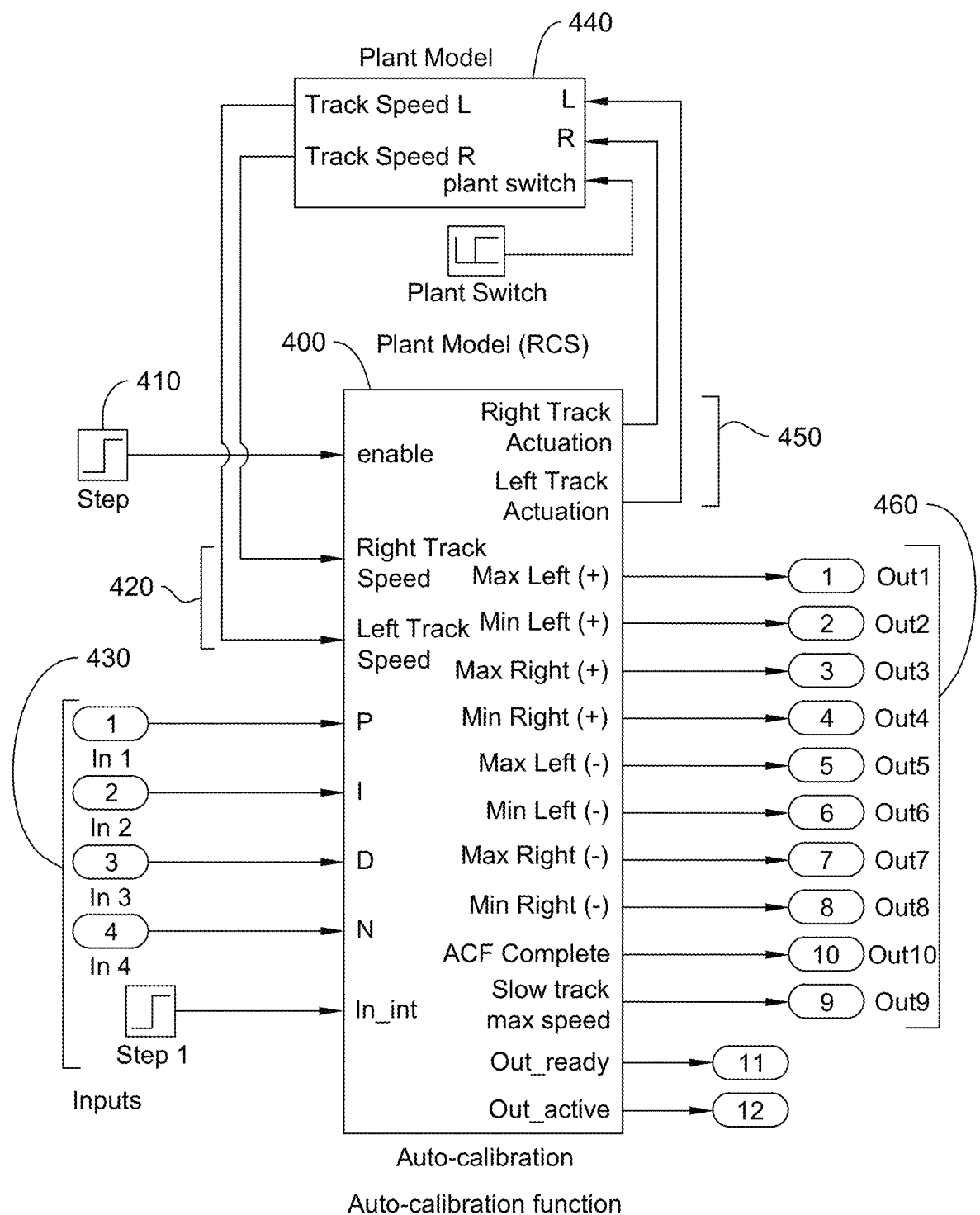
FIG. 4 is a graphical model of the control functions of an embodiment.

FIG. 4 is an overall view of a graphical model 400 of the autocalibration control functions of an embodiment directed to control of a tracked vehicle, showing exemplary procedures for autocalibration of the speed of a tracked vehicle through regulation of the vehicle's respective track actuators 155, etc. As stated above, the Simulink modeling language is used in this and other figures to disclose the claimed methods, but the methods are not dependent on, nor do they require, the use of Simulink modeling or any particular modeling language. In particular, the Simulink models shown in the drawings, and the parameters, inputs, and outputs shown therein are not limiting, but only illustrative of the ways and means by which the claimed methods may be accomplished. None of the blocks or parameters so illustrated should be taken as necessary for implementation of the claimed improvements.

Table 1 following lists definitions for the various identifiers shown as input parameters in the FIG. 4 procedure block relevant to the procedures for autocalibration of actuators. In the figures, the term "plant" or "plant model" refers to the physical machines or devices to be controlled; in this example, motors for a tracked vehicle.

TABLE 1

| Name | Source | Description |
|---|---|---|
| Enable | RCS Signal | Signal from RCS to start autocalibration |
| Right Track Speed | RCS Signal | Signal data from right track speed sensor |
| Left Track Speed | RCS Signal | Signal data from left track speed sensor |
| P | Parameter | Proportional gain for autocalibration PID |
| I | Parameter | Integral gain for PID |
| D | Parameter | Derivative Gain for PID |
| N | Parameter | Filter value for PID |

TABLE 1-continued

| Name | Source | Description |
|---|---|---|
| In_init | RCS Signal | Signal from RCS that will halt autocalibration if communication is lost |

The PID parameters P, I, D, and N listed in Table 1 are set initially based on the system being calibrated; that is whether the system being calibrated is a track actuator system, as illustrated, or other actuator-driven systems, such as a water-pump control system or the rotary head feed system of a drilling machine, the disclosure and claims here being appropriate to all such systems.

Table 2 following lists definitions for the various identifiers shown as output parameters in the FIG. 4 procedure block relevant to the procedures for autocalibration of actuators.

TABLE 2

| Name | Source | Description |
|---|---|---|
| Right Track Actuation | Control Signal | Signal from Autocal to pump controller in mA |
| Left Track Actuation | Control Signal | Signal from Autocal to pump controller in mA |
| Max Left+ | AutoCal Result | New parameter for maximum control value for left track in positive direction |
| Min Left+ | AutoCal Result | New parameter for minimum control value left track in positive direction |
| Max Right+ | AutoCal Result | New parameter for maximum control value for right track in positive direction |
| Min Right+ | AutoCal Result | New parameter for minimum control value right track in positive direction |
| Max Left− | AutoCal Result | New parameter for maximum control value for left track in negative direction |
| Min Left− | AutoCal Result | New parameter for minimum control value left track in negative direction |
| Max Right− | AutoCal Result | New parameter for maximum control value for right track in negative direction |
| Min Right− | AutoCal Result | New parameter for minimum control value right track in negative direction |
| ACF Complete | AutoCal signal | Signal RCS that AutoCal function is complete |
| Slow Track Max Speed | AutoCal Signal | Output Value of the fastest speed of the slowest track |
| Out_Ready | AutoCal Signal | Digital handshake that alerts RCS that block is ready to start |
| Out_Active | AutoCal Signal | Digital handshake that AutoCal is active |

Particular inputs and outputs shown in the above tables include: an enable signal 410 to start autocalibration, the inputs 420 from speed sensors, and the PID parameters 430 previously determined. The plant model 440 has as input left and right track actuation signals 450 and as outputs left and right speed signals, as shown in FIG. 4 and Table 1. FIG. 4 further shows the set of outputs 460 described in Table 2 above, which include the left and right control signals just mentioned, and also the autocalibration parameters for maximum and minimum control values for left and right, and positive and negative directions.

Figure 5:
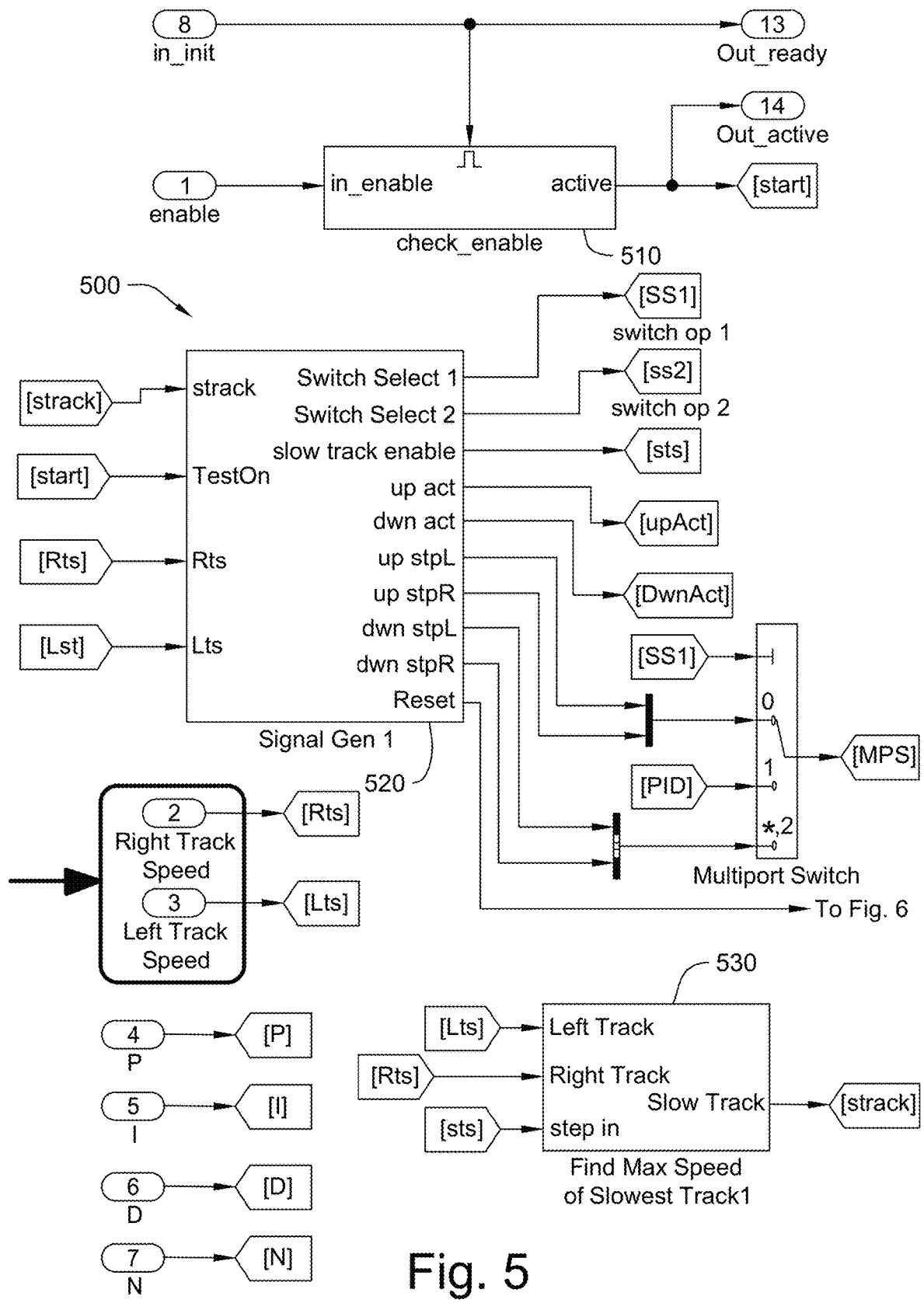
FIG. 5 is a graphical model of the control functions of an embodiment, showing portions of the model of FIG. 4 in more detail.
Figure 6:
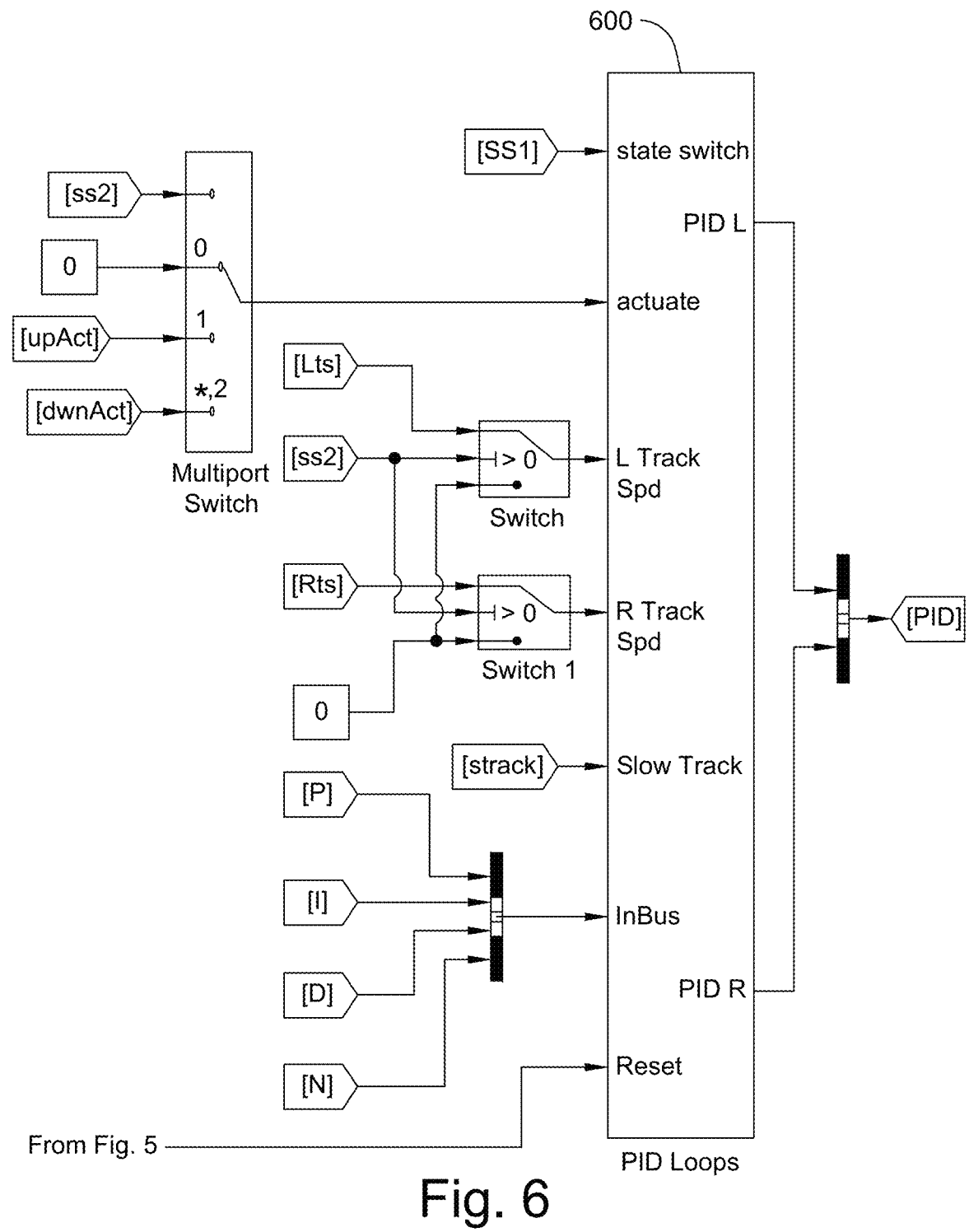
FIG. 6 is a graphical model of the control functions of an embodiment, showing further portions of the model of FIG. 4 in more detail.
Figure 7:
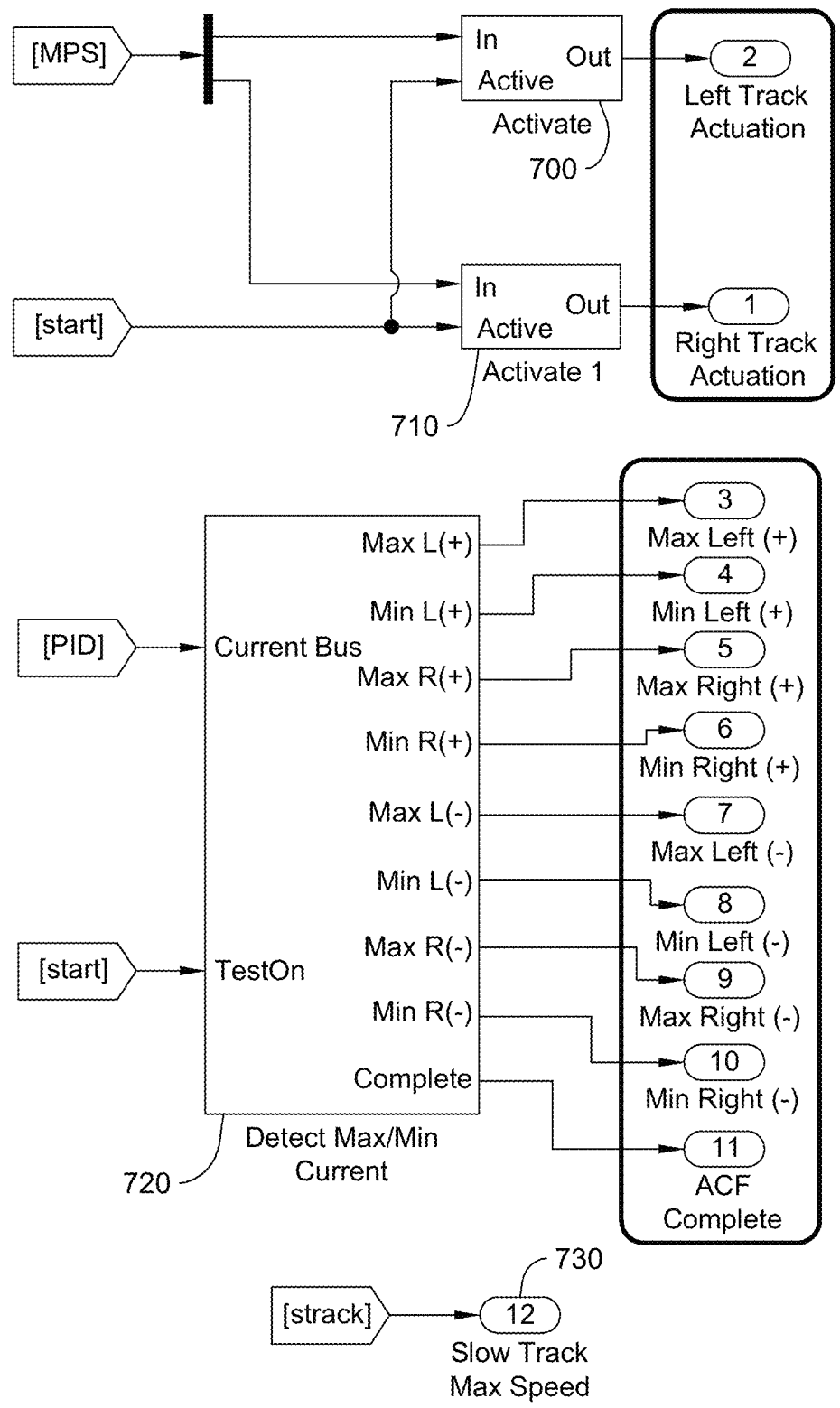
FIG. 7 is a graphical model of the control functions of an embodiment, showing further portions of the model of FIG. 4 in more detail.

The following explanation of symbols appearing in FIGS. 5-7 are offered as a convenience to the reader who may not be familiar with Simulink conventions. The following symbol is a From block:

The From block accepts a signal from a corresponding Goto block, then passes it as output. This is the symbol for a Goto block:

A From block can receive its signal from only one Goto block, although a Goto block can pass its signal to more than one From block. Goto blocks and From blocks are matched by the use of Goto tags, such as "[A]" in the examples above. This description should allow the reader to understand the flow of processing in the following figures.

FIG. 5 is illustration in the Simulink modeling language for further details of procedures in the procedure block 400 shown in FIG. 4. The inputs and outputs in FIGS. 5, 6, and 7 correspond to inputs and outputs of procedure block 400. In the set of procedure blocks 500, block 510 represents a digital handshake between the computer 100 and the autocalibration function 400.

Block 520 represents internal signal generation. This is a Simulink state flow block that activates switch blocks at each state of the autocalibration procedure.

Block 530 represents a function block that captures the maximum speed of the slowest track, so as to ensure the maximum target speed is attainable by both tracks.

FIG. 6 is an illustration in the Simulink modeling language for further details of procedures in the procedure block 400 shown in FIG. 4. In FIG. 6, procedure block 600 represents the internal PID loops. The state switch input changes the internal PID from open loop to closed-loop operation. When in open-loop operation, the PID loops receive a set point of zero to avoid windup. When in closed-loop operation, the set point is the maximum speed to the slowest track.

FIG. 7 is an illustration in the Simulink modeling language for further details of procedures in the procedure block 400 shown in FIG. 4. In FIG. 7, procedure block 700 activates a left track actuator, and procedure block 710 activates a right track actuator as denoted a track actuation outputs 450 in FIG. 4. Procedure block 720 illustrates detection of minimum and maximum transducer current and corresponding outputs 460 from same as denoted in FIG. 4. An output 730 is provided for the maximum speed of the slowest track, included in corresponding outputs 450 in FIG. 4.

None of the description in this application should be read as implying that any particular element, step, or function is an essential element which must be included in the claim scope; the scope of patented subject matter is defined only by the allowed claims. Moreover, none of these claims are intended to invoke 35 U.S.C. Section 112(f) unless the exact words "means for" are used, followed by a gerund. The claims as filed are intended to be as comprehensive as possible, and no subject matter is intentionally relinquished, dedicated, or abandoned.

I claim:

1. A method for automatic calibration of an actuator, where the actuator has an input control signal and an output, the method comprising:
    adjusting the input control signal to command the actuator to its maximum output;
    saving the value of the maximum output as a set point value;
    sending the set point value to a pre-programmed proportional-integral-derivative controller (PID);
    commanding the actuator to maximum output by a signal from the PID controller;
    detecting the output of the actuator;
    comparing the output of the actuator to the set point value; where,
    if the output of the actuator compared to the set point value is greater than a predetermined value, then,
        sending the output of the actuator to the PID controller; and, returning to the step of detecting the output of the actuator;
    else;
        saving the last PID controller output as a calibrated set point for maximum actuator output.

2. The method of claim 1, further comprising:
    displaying the calibrated set point to an operator.

3. The method of claim 2, where the PID controller has default parameters for at least one of proportional gain, integral gain, derivative gain, or a filter value.

4. The method of claim 3, further comprising:
    selecting the calibrated set point to replace at least one default parameter of the PID controller.

5. A system for automatic calibration of an actuator, the system comprising:
    an actuator, the actuator having a maximum output value and a minimum output value;
    a computer; the computer further comprising a PID controller; the PID controller having an input and an output;
    a sensor connected to the actuator for transmitting values representing the motion of the actuator to the input of the PID controller;
    the computer programmed to selectively store default parameters for the PID controller; where the default parameters are based on the type of actuator system being calibrated;
    the computer further programmed to compare the values representing the motion of the actuator to the output of the PID controller when the actuator is selectively commanded to a maximum output value or a minimum output value;
    the computer further programmed to output an error signal representing the difference between the output of the PID controller and the values representing the motion of the actuator;
    where the computer is programmed to store the error signal as a calibrated set point when the difference is less than a predetermined amount.

6. The system for automatic calibration of claim 5, further comprising a transducer connected between the output of the PID controller and the actuator.

7. The system for automatic calibration of claim 6, where the transducer is an electric-to-hydraulic transducer.

8. The system for automatic calibration of claim 5, where the default parameters of the PID controller comprise at least one of proportional gain, integral gain, derivative gain, or a filter value.

9. The system for automatic calibration of claim 5, where the actuator is a hydraulic motor.

10. The system for automatic calibration of claim 5, further comprising:
    a visual display; the visual display connected to the computer; and,
    the visual display showing the calibrated set point to an operator.

11. The system for automatic calibration of claim 5, further comprising:
    an endless track for propelling a tracked vehicle; and,
    the actuator connected to drive the endless track.

12. A drilling machine, the drilling machine comprising:
    at least one actuator for moving the drilling machine; the actuator having a maximum output value and a minimum output value; and, a system for automatic calibration of the actuator, the system for automatic calibration of the actuator comprising:
a computer; the computer further comprising a PID controller; the PID controller having an input and an output;
a sensor connected to the at least one actuator for transmitting values representing the motion of the at least one actuator to the input of the PID controller;
the computer programmed to selectively store default parameters for the PID controller; where the default parameters are based on the type of actuator system being calibrated;
the computer further programmed to compare the values representing the motion of the at least one actuator to the output of the PID controller when the actuator is selectively command to a maximum output value or a minimum output value;
the computer further programmed to output an error signal representing the difference between the output of the PID controller and the values representing the motion of the at least one actuator;
where the computer is programmed to store the error signal as a calibrated set point when the difference is less than a predetermined amount.

13. The drilling machine of claim 12, further comprising a transducer connected between the output of the PID controller and the actuator.

14. The drilling machine of claim 13 where the transducer is an electric-to-hydraulic transducer.

15. The drilling machine of claim 12, where the default parameters of the PID controller comprise at least one of proportional gain, integral gain, derivative gain, or a filter value.

16. The drilling machine of claim 12, where the actuator is a hydraulic motor.

17. The drilling machine of claim 12, further comprising:
an endless track for propelling a tracked vehicle; and,
the at least one actuator connected to the endless track.

* * * * *